(12) United States Patent
Diamond et al.

(10) Patent No.: US 10,948,505 B2
(45) Date of Patent: Mar. 16, 2021

(54) APPARATUSES AND METHODS FOR SUSPENDING AND WASHING THE CONTENTS OF A PLURALITY OF CUVETTES

(71) Applicant: Hycor Biomedical, LLC, Indianapolis, IN (US)

(72) Inventors: Ronald Norman Diamond, Anaheim Hills, CA (US); Steve Michael Gann, Huntington Beach, CA (US); Eric Darnell Hall, Huntington Beach, CA (US); Tae Ho Hwang, Brea, CA (US); John Lewis Morton, Canyon Lake, CA (US); Anatoly Moskalev, Irvine, CA (US); Bruce Alan Sargeant, Orange, CA (US); Dennis Edwin Rieger, Hermosa Beach, CA (US); Marinela Gombosev, Newport Beach, CA (US); Mark David Van Cleve, Long Beach, CA (US)

(73) Assignee: HYCOR Biomedical, LLC, Indianapolis, IN (US)

( * ) Notice: Subject to any disclaimer, the term of this patent is extended or adjusted under 35 U.S.C. 154(b) by 566 days.

(21) Appl. No.: 15/553,504

(22) PCT Filed: Feb. 24, 2016

(86) PCT No.: PCT/US2016/019392
§ 371 (c)(1),
(2) Date: Aug. 24, 2017

(87) PCT Pub. No.: WO2016/138157
PCT Pub. Date: Sep. 1, 2016

(65) Prior Publication Data
US 2018/0017590 A1    Jan. 18, 2018

Related U.S. Application Data

(60) Provisional application No. 62/126,104, filed on Feb. 27, 2015.

(51) Int. Cl.
*G01N 35/02* (2006.01)
*G01N 21/01* (2006.01)
(Continued)

(52) U.S. Cl.
CPC ............... *G01N 35/02* (2013.01); *B03C 1/01* (2013.01); *B03C 1/0332* (2013.01); *B03C 1/288* (2013.01);
(Continued)

(58) Field of Classification Search
CPC .. G01N 35/02; G01N 35/025; G01N 35/0098; G01N 35/1011;
(Continued)

(56) References Cited

U.S. PATENT DOCUMENTS 3,951,605 A    4/1976  Natelson
4,227,810 A   10/1980  Sandrock et al.
(Continued)

FOREIGN PATENT DOCUMENTS

EP    0479448      4/1992
JP    H06-160401   6/1994
(Continued)

OTHER PUBLICATIONS

Extended European Search Report issued in related European Patent Application No. 16756294.1 dated Aug. 10, 2018.
(Continued)

*Primary Examiner* — Benjamin R Whatley
(74) *Attorney, Agent, or Firm* — K&L Gates LLP; Louis C. Cullman; Dennis A. Majewski

(57) ABSTRACT

Apparatuses and methods for washing a plurality of fluid samples are disclosed herein. In an embodiment, a system
(Continued)

for washing a plurality of fluid samples respectively located within a plurality of cuvettes includes a rotor configured to rotate the plurality of cuvettes about an axis, a traveler mechanism located beneath the rotor, the traveler mechanism configured to move a plurality of magnets parallel to the axis of rotation of the rotor to position the plurality of magnets so that each cuvette of the plurality of cuvettes is located adjacent to at least one magnet of the plurality of magnets, and a wash system located above the rotor, the wash system configured to at least one of inject fluid into or aspirate fluid from the plurality of the cuvettes, while the plurality of magnets suspend magnetic particles located within each of the plurality of cuvettes.

20 Claims, 10 Drawing Sheets

(51) Int. Cl.
  *G01N 35/10* (2006.01)
  *G01N 35/00* (2006.01)
  *G01N 35/04* (2006.01)
  *B03C 1/033* (2006.01)
  *B03C 1/01* (2006.01)
  *B03C 1/28* (2006.01)
(52) U.S. Cl.
  CPC ......... *G01N 21/01* (2013.01); *G01N 35/0098* (2013.01); *G01N 35/025* (2013.01); *G01N 35/1011* (2013.01); *B03C 2201/18* (2013.01); *B03C 2201/26* (2013.01); *G01N 2035/0437* (2013.01); *G01N 2035/0455* (2013.01); *G01N 2035/0477* (2013.01)
(58) Field of Classification Search
  CPC ... G01N 2035/0437; G01N 2035/0455; G01N 2035/0477; G01N 21/01; B03C 1/01; B03C 1/0332; B03C 1/288; B03C 2201/18; B03C 2201/26
  See application file for complete search history.

(56) References Cited

U.S. PATENT DOCUMENTS

| | | |
|---|---|---|
| 4,251,159 A | 2/1981 | White |
| 4,302,421 A | 11/1981 | Baker |
| 4,635,665 A | 1/1987 | Namba et al. |
| 4,659,550 A | 4/1987 | Schildknecht |
| 4,683,120 A | 7/1987 | Meserol et al. |
| 4,687,962 A | 8/1987 | Elbert |
| 5,104,808 A | 4/1992 | Laska et al. |
| 5,128,103 A | 7/1992 | Wang et al. |
| 5,128,104 A | 7/1992 | Murphy et al. |
| 5,183,638 A | 2/1993 | Wakatake |
| 5,314,825 A * | 5/1994 | Weyrauch ........ G01N 35/00663 356/246 |
| 5,514,330 A | 5/1996 | Uzan et al. |
| 5,525,515 A | 6/1996 | Blattner |
| 5,702,950 A | 12/1997 | Tajima |
| 5,705,062 A | 1/1998 | Knobel |
| 5,741,708 A | 4/1998 | Carey et al. |
| 5,869,328 A | 2/1999 | Antoci et al. |
| 5,885,530 A | 3/1999 | Babson et al. |
| 6,143,250 A | 11/2000 | Tajima |
| 6,143,578 A | 11/2000 | Bendele et al. |
| 6,187,270 B1 | 2/2001 | Schmitt |
| 6,231,814 B1 | 5/2001 | Tajima |
| 6,331,277 B2 | 12/2001 | Tajima |
| 6,368,561 B1 | 4/2002 | Rutishauser et al. |
| 6,422,248 B1 | 7/2002 | Fuerst et al. |
| 6,531,096 B1 | 3/2003 | Deveney et al. |
| 6,592,825 B2 | 7/2003 | Pelc et al. |
| 6,827,901 B2 | 12/2004 | Copeland et al. |
| 6,849,236 B2 | 2/2005 | Spitz et al. |
| 6,881,579 B2 | 4/2005 | Hilson et al. |
| 6,943,029 B2 | 9/2005 | Copeland et al. |
| 7,064,837 B2 | 6/2006 | Mori et al. |
| 7,201,875 B2 | 4/2007 | Norton et al. |
| 7,396,690 B2 | 7/2008 | Colin |
| 7,427,510 B2 | 9/2008 | Schubert et al. |
| 7,429,360 B2 | 9/2008 | Kureshy et al. |
| 7,507,377 B2 | 3/2009 | Rousseau et al. |
| 7,544,326 B2 | 6/2009 | Norton et al. |
| 7,633,615 B2 | 12/2009 | Emilsson |
| 7,651,869 B2 | 1/2010 | Saaski et al. |
| 7,718,072 B2 | 5/2010 | Safar et al. |
| 7,727,469 B2 | 6/2010 | Takahashi et al. |
| 7,763,467 B2 | 7/2010 | Knight |
| 7,850,917 B2 | 12/2010 | Ding et al. |
| 7,850,921 B2 | 12/2010 | Iguchi et al. |
| 7,932,081 B2 | 4/2011 | Lair et al. |
| 7,956,317 B2 | 6/2011 | Artyushenko |
| 8,007,740 B2 | 8/2011 | Liu et al. |
| 8,008,066 B2 | 8/2011 | Lair et al. |
| 8,092,763 B2 | 1/2012 | Bombach et al. |
| 8,233,146 B2 | 7/2012 | Chen |
| 8,284,389 B2 | 10/2012 | Forrer et al. |
| 8,367,022 B2 | 2/2013 | Warhurst et al. |
| 8,372,356 B2 | 2/2013 | Warhurst et al. |
| 8,431,404 B2 | 4/2013 | Spense et al. |
| 8,545,760 B2 | 10/2013 | Yamamoto et al. |
| 8,597,882 B2 | 12/2013 | Corbett et al. |
| 8,731,709 B2 | 5/2014 | Tatsutani et al. |
| 8,840,848 B2 | 9/2014 | Kraihanzel |
| 8,873,121 B2 | 10/2014 | Shin et al. |
| 2003/0026732 A1 | 2/2003 | Gordon et al. |
| 2004/0265173 A1* | 12/2004 | Matsumoto .......... G01N 35/025 422/64 |
| 2005/0244972 A1 | 11/2005 | Hilson et al. |
| 2005/0266570 A1 | 12/2005 | Carey et al. |
| 2008/0063567 A1 | 3/2008 | Schacher et al. |
| 2008/0095676 A1 | 4/2008 | Andretta |
| 2008/0190458 A1 | 8/2008 | Garcia Gros et al. |
| 2009/0082214 A1 | 3/2009 | Liu et al. |
| 2011/0065086 A1 | 3/2011 | Bruno |
| 2011/0093207 A1 | 4/2011 | Ingber et al. |
| 2011/0203997 A1 | 8/2011 | Meyer |
| 2012/0295358 A1 | 11/2012 | Ariff et al. |
| 2013/0095508 A1 | 4/2013 | Campitelli et al. |
| 2013/0121880 A1 | 5/2013 | Yamazaki |
| 2013/0171673 A1 | 7/2013 | Folonier et al. |
| 2013/0203049 A1* | 8/2013 | Corbett .............. G01N 35/0098 435/6.11 |
| 2014/0274784 A1 | 9/2014 | Van Cleve et al. |
| 2014/0341789 A1 | 11/2014 | Wang et al. |
| 2014/0356235 A1* | 12/2014 | Uchikawa .......... G01N 35/0098 422/82.09 |
| 2017/0292966 A1* | 10/2017 | Yu ....................... G01N 35/0098 |

FOREIGN PATENT DOCUMENTS

| | | |
|---|---|---|
| JP | H11-326338 | 11/1999 |
| JP | 2001-159633 | 6/2001 |
| JP | 2006-78201 | 3/2006 |
| JP | 2012-63364 | 3/2012 |
| WO | 2014/145619 A1 | 9/2014 |

OTHER PUBLICATIONS

Office Action issued in related Chinese Patent Application No. 201680012376.1 dated Jun. 26, 2019 and English translation of same.
Office Action issued in related Japanese Patent Application No. 2017-563502 dated Jul. 2, 2019 and English translation of same.
Office Action issued in related Japanese Patent Application No. 2017-563502 dated Sep. 4, 2018 and English translation of same.

* cited by examiner

APPARATUSES AND METHODS FOR SUSPENDING AND WASHING THE CONTENTS OF A PLURALITY OF CUVETTES

FIELD OF THE DISCLOSURE

The present disclosure relates generally to methods and apparatuses for suspending and washing the contents of a plurality of cuvettes, and more specifically to a rotor, traveler mechanism and multi-wash mechanism that work in conjunction to quickly and efficiently suspend and wash the contents of a plurality of cuvettes.

BACKGROUND OF THE DISCLOSURE

Many immunochemistry analysis systems require that analyte molecules in a patient's biological sample (e.g. serum or plasma) attach to paramagnetic particles. Such systems require that magnets be positioned so that the paramagnetic particles can be localized and one or more washing steps can be performed to remove background signals associated with potential contaminants and interfering substances that may be present in samples.

The analyses performed by these systems, however, are relatively slow because the equipment required is bulky and it is difficult to both localize paramagnetic particles and wash a plurality of samples at the same time. There is accordingly a need for equipment that streamlines this process, that is, efficiently localizes the paramagnetic particles in a plurality of cuvettes so that the washing steps can be performed while the paramagnetic particles are localized.

Older systems have exhibited performance problems including unacceptably long collection times, beads failing to stay on the magnets during wash, and non-resuspendability of the beads in the next step—stronger magnets benefit the first and second of these, but impact the third. Thus a successful system must provide the best balance of magnet strength and duration of collection.

SUMMARY OF THE DISCLOSURE

The present disclosure is directed to apparatuses and methods for washing a plurality of fluid samples respectively located within a plurality of cuvettes. In a general embodiment, a system for washing a plurality of fluid samples includes a rotor configured to rotate the plurality of cuvettes about an axis, a traveler mechanism located beneath the rotor, the traveler mechanism configured to move a plurality of magnets parallel to the axis of rotation of the rotor to position the plurality of magnets so that each cuvette of the plurality of cuvettes is located adjacent to at least one magnet of the plurality of magnets, and a wash system located above the rotor, the wash system configured to at least one of inject fluid into or aspirate fluid from the plurality of the cuvettes, while the plurality of magnets suspend magnetic particles located within each of the plurality of cuvettes.

In another embodiment, the axis of rotation of the rotor is a vertical axis.

In another embodiment, the wash system is configured to inject fluid into and aspirate fluid from the plurality of the cuvettes.

In another embodiment, the plurality of magnets includes a plurality of first magnets with a first polarity and a plurality of second magnets with an opposite second polarity.

In another embodiment, the traveler system is configured to position the plurality of magnets so that each of the plurality of cuvettes has a first magnet on a first side and a second magnet on an opposite second side.

In another embodiment, the wash system includes a plurality of probes configured to at least one of inject fluid into or aspirate fluid from the plurality of the cuvettes.

In another embodiment, the probes each include a first portion to aspirate fluid from a respective cuvette and a second portion to inject fluid into the respective cuvette.

In another embodiment, the wash system includes a probe positioning sensor configured to determine if at least one of the probes is misaligned.

In another embodiment, the traveler mechanism includes a guide rail and a sliding device, and the sliding device translates along the guide rail to position the plurality of magnets so that each cuvette of the plurality of cuvettes is located adjacent to at least one magnet of the plurality of magnets.

In another embodiment, the sliding device includes a base portion and a magnet holder, the base portion is moveable along the guide rail, and the magnet holder is separately moveable with respect to the base portion.

In another embodiment, the plurality of magnets is positioned in an arc that corresponds to an arc of the plurality of cuvettes located on the rotor.

In a general embodiment, a system for washing a plurality of fluid samples respectively located within a plurality of cuvettes includes a holder to hold the plurality of cuvettes, a traveler mechanism configured to translate upwardly towards the plurality of cuvettes held by the holder and position a plurality of magnets adjacent to the plurality of cuvettes so that each cuvette of the plurality of cuvettes has a first magnet of the plurality of magnets adjacent to a first side and a second magnet of the plurality of magnets adjacent to an opposite second side, thereby suspending magnetic particles located within each of the plurality of cuvettes, and a wash system configured to translate downwardly towards the plurality of cuvettes held by the holder so as to position a probe within each of the plurality of cuvettes while the plurality of magnets suspend the magnetic particles located within each of the plurality of cuvettes.

In another embodiment, the system includes a rotor, the rotor includes the holder, and the rotor is configured to rotate the plurality of cuvettes about an axis to position the cuvettes over the traveler system.

In another embodiment, the axis of rotation of the rotor is a vertical axis, and the traveler mechanism is configured to translate upwardly parallel to the vertical axis.

In another embodiment, the traveler mechanism includes a guide rail and a sliding device, and the sliding device translates along the guide rail to position the plurality of magnets adjacent to the plurality of cuvettes.

In another general embodiment, a method of washing a plurality of fluid samples respectively located within a plurality of cuvettes includes adding magnetic particles to the plurality of cuvettes, rotating the plurality of cuvettes over a plurality of magnets, raising the plurality of magnets so that each cuvette of the plurality of cuvettes has a first magnet of the plurality of magnets adjacent to a first side and a second magnet of the plurality of magnets adjacent to an opposite second side, suspending the magnetic particles in the plurality of cuvettes with the plurality of magnets, lowering a plurality of probes so that each cuvette of the plurality of cuvettes has a probe of the plurality of probes located therein, and aspirating fluid from each cuvette of the plurality of cuvettes with a respective probe.

In another embodiment, raising the magnets includes positioning a magnet having a first polarity adjacent to the first side and a magnet having an opposite second polarity adjacent to the second side.

In another embodiment, the method includes raising the plurality of probes away from the cuvettes and detecting if one or more of the probes becomes misaligned.

In another embodiment, the method includes locking the cuvettes into a rotor with a removeable lid.

In another embodiment, the method includes raising the plurality of magnets and lowering the plurality of probes in directions parallel to a rotational axis of the cuvettes.

BRIEF DESCRIPTION OF THE DRAWINGS

Embodiments of the present disclosure will now be explained in further detail by way of example only with reference to the accompanying figures, in which.

DETAILED DESCRIPTION

Figure 1:
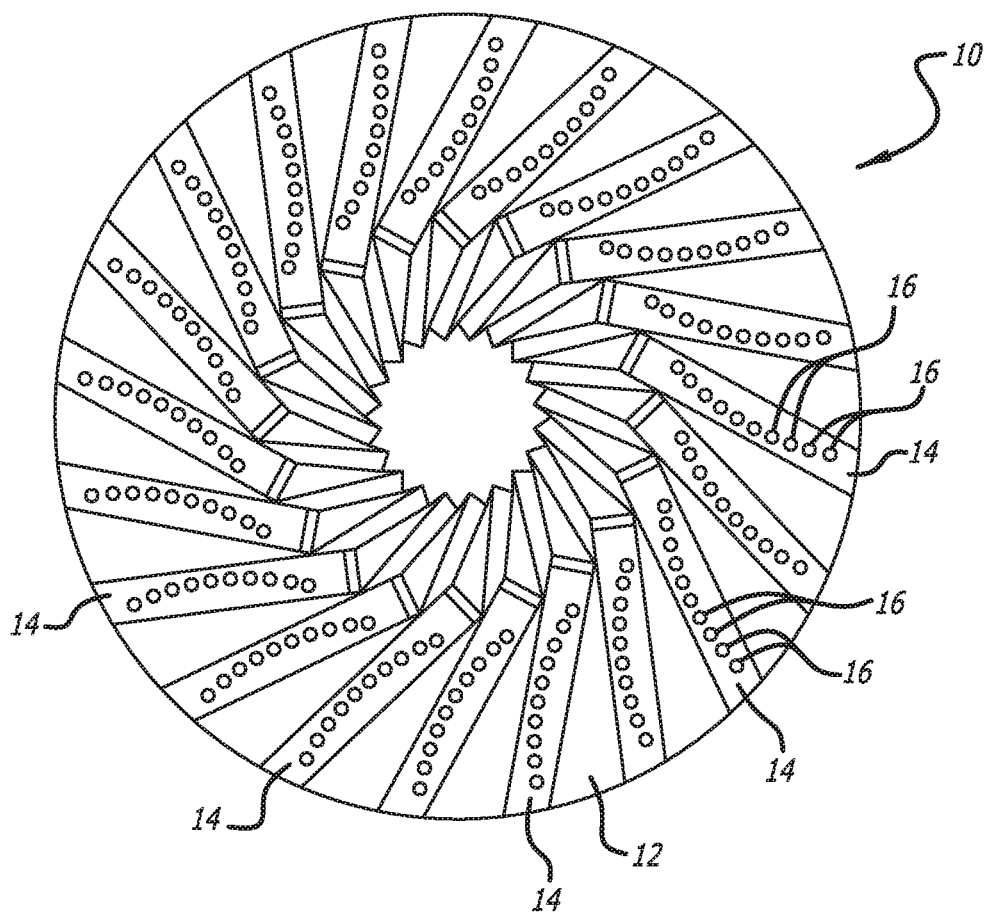
FIG. 1 is a top plan view of an embodiment of a reaction rotor according to the present disclosure.

Before describing in detail the illustrative system and method of the present disclosure, it should be understood and appreciated herein that as a way of minimizing background signals caused by interfering substances present in specimens and reagents, immunoassays generally require that one or more separation phases be carried out in a reaction cuvette. To facilitate the separation or washing process, a variety of techniques can be used, including, but not limited to, well coating techniques, bead coating techniques, or the use of paramagnetic particles. According to certain aspects of the present disclosure, the system utilizes common paramagnetic particles, including, but not limited to, magnetic beads or microparticles. When paramagnetic particles are used as separation media, the paramagnetic particles are pulled to the wall of the cuvette by magnets during the washing process and then all of the liquid is aspirated.

In the beginning of the process, the paramagnetic particles are coated with a capture reagent that will eventually bind analyte molecules of interest in the patient's blood sample. In accordance with certain aspects of the present teachings, the biotinylated capture reagent can exist as an amalgam or mixture (i.e., capture reagents from a similar category but from different genus species). As those of skill in the art will understand and appreciate herein, numerous capture reagents are available and can be used in accordance with the present teachings, including those available for license from the FDA, such as Mixed Vespid Venom Protein (mixed yellow jacket, yellow hornet, and white faced hornet). It should be understood herein that the amount and volume of each of the individual capture reagents used in accordance with the present disclosure depends on the potency (i.e. the ability to produce a detectable response). In accordance with certain aspects of the present disclosure, a capture reagent that can be used for performing a diagnostic immunoassay is comprised of Biotin-pAb or Biotin-allergens, 10 mM sodium phosphate, pH 7.4, 0.9% NaCl, 0.05% Tween-20, 1% (w/v) human serum albumin, 1% (v/v) ProClin 950, up to 5% (v/v) glycerol. In accordance with still other aspects of the present disclosure, another capture reagent that can be used for performing a diagnostic immunoassay is comprised of Biotin-Ags, 10 mM sodium phosphate, pH 7.4, 0.9% (w/v) NaCl, 0.05% Tween-20, 1% (w/v) bovine serum albumin, 1% (v/v) ProClin 950, 1% protease inhibitor cocktail, 0.1 mM DTT, 25% (up to 30%) (v/v) glycerol.

After the capture reagents bind to the paramagnetic particles and the cuvettes undergo a washing process, the patient sample, and optionally a diluent if needed, is added to the particles in the cuvettes and incubated. This allows analytes of interest in a patient's blood sample bind to the capture reagent that has in turn been bound to the surface of a paramagnetic particle. In accordance with one specific illustrative aspect of the present disclosure, the reaction diluent (sample diluent) is comprised of 10 mM sodium phosphate, pH 7.4, 500 mM NaCl, 0.02% Tween-20, 1% (w/v) human serum albumin, 1% (v/v) human IgG, 1% (v/v) ProClin 950, 0.005% Antifoam-B v/v, 2% (w/v) PEG 6,000. In accordance with yet another specific illustrative aspect of the present disclosure, the reaction diluent (sample diluent) is comprised of 10 mM sodium phosphate, pH 7.4, 500 mM NaCl, 0.02% Tween-20, 25% (w/v) human serum albumin, 1% (v/v) ProClin 950. In accordance with these illustrative embodiments, it should be understood herein that the high percentage of HSA (25%) functions in part to increase the viscosity of the reaction medium in order to retain beads in suspension during the incubation step. In addition, high HSA also reduces non-specific binding during this incubation, and improves relative light unit (RLU) linearity upon dilution of the patient sample.

After the patient sample incubation period, another washing process is performed to remove any excess or unbound sample, and then a conjugate and a luminescent label are added to the cuvette. When added to the cuvette, it can be expected that some portion of the conjugate will bind to the capture reagent/sample complex on the paramagnetic particles after an incubation period. The particles then undergo another wash process to remove any unbound conjugate, and then the luminescent label is added to the cuvette and incubated for a short period of time to allow the chemiluminescent glow reaction to reach equilibrium. After equilibrium is reached, luminescence and fluorescence readings of the sample can be taken.

In accordance with the above-described process, the present disclosure provides an apparatus and method for performing the wash steps after any one of the capture reagent, patient sample, luminescent label and conjugate are added to a plurality of cuvettes and allowed to bind with paramagnetic particles within the cuvettes. That is, the present disclosure provides an efficient system and method for performing one or more wash steps within the cuvettes while the paramagnetic particles are localized.

FIGS. 1 to 8 illustrate a system for washing a plurality of cuvettes 18. In an embodiment, the system includes a reaction rotor 10, a magnetic traveler mechanism 30 and a multi-wash mechanism 60, and can further include a lid mechanism 100. Although these elements of the system are shown separately in the various drawings, it will be understood by the following disclosure that each element from the drawings can operate individually or in combination with each other element in the drawings, and that the combination of some or all of these elements working in conjunction with each other provides an advantageous system and method for suspending paramagnetic particles within a plurality of cuvettes and performing a number of washing steps.

FIG. 1 illustrates a top view of an embodiment of a reaction rotor 10 according to the present disclosure. In use, reaction rotor 10 rotates a plurality of cuvettes 18 and creates an environment that allows paramagnetic particles to be suspended within the cuvettes 18 for a number of washing steps. Although not shown in FIG. 1, the magnetic traveler mechanism 30 is located below the reaction rotor 10 in a preferred embodiment, and the multi-wash mechanism 60 is located above the reaction rotor 10 in a preferred embodiment. The interaction of these elements with reaction rotor 10 is described in more detail below.

As illustrated, reaction rotor 10 includes a top surface 12 that has a plurality of sections 14. Each section 14 includes a plurality of apertures 16. In the illustrated embodiment, there are twenty sections 14, and each section 14 includes ten apertures 16, but those of ordinary skill in the art will understand that any number of sections 14 and apertures 16 can be used.

Each aperture 16 is configured to receive a cuvette 18 (FIGS. 2 to 7), so in the illustrated embodiment, each section 14 is configured to receive ten cuvettes 18. The cuvettes 18 placed in the apertures 16 within each section 14 can be connected to each other, can be separate cuvettes 18 that are each individually loaded into the apertures 16, or can be made a permanent part of reaction rotor 10. In an embodiment, a cuvette rack 17 including a plurality of connected cuvettes 18 can be inserted into one or more of the sections 14 so that each connected cuvette 18 is received by a corresponding aperture 16 in the section 14.

As illustrated in FIG. 1, each section 16 is angled from the outer diameter of the reaction rotor 10 to an inner diameter of the reaction rotor 10, and the plurality of apertures 18 within each section 14 form an arc from the end of each section 14 located at the outer diameter of the reaction rotor 10 to the opposite end of each section 14 at the inner diameter of the reaction rotor 10. As explained in more detail below, the arc of the cuvettes is advantageous because it eliminates magnetic cross-talk between magnets 40, 41 that operate in conjunction with reaction rotor 10. The arc of the cuvettes also allows various rotating pipettes to access each of the cuvettes in the arc.

The cuvettes 18 that are loaded into the apertures 16 of reaction rotor 10 are typically initially empty, but can also be loaded into the apertures 16 already containing paramagnetic particles. If empty cuvettes are loaded into the apertures 16, then a pipette (not shown) can transfer paramagnetic particles to the reaction rotor 10 and inject the paramagnetic particles into one or more of the cuvettes 18 located within the apertures 16. Once the paramagnetic particles are located in the cuvettes, a capture reagent can be injected into each cuvette 18 by the same or a different pipette, or by multi-wash mechanism 60 described in more detail below. That is, one or more pipettes can aspirate a desired quantity of paramagnetic particles and transfer the aspirated quantity to the reaction rotor 10, where the paramagnetic particles can be injected by the pipette into one or more of the cuvettes 18 located within the apertures 16. The one or more pipettes can then aspirate a desired quantity of a capture reagent and transfer the aspirated quantity to the reaction rotor 10, where the capture reagent can then be mixed with the paramagnetic particles in the cuvettes 18. In an embodiment, the pipette that injects the paramagnetic particles, capture reagent or other fluid into a cuvette 18 can vibrate within the cuvette to mix the contents of the cuvette during injection or aspiration.

Once the paramagnetic particles and the capture reagent have been added to one or more of the cuvettes, the capture reagent is allowed to bind to the paramagnetic particles during an incubation period. Typically, the incubation period is about five minutes. After the incubation period, the excess capture reagent that does not bind to the paramagnetic particles must be removed from the cuvettes using the magnetic traveler mechanism 30 and multi-wash mechanism 60 in conjunction with reaction rotor 10. As described in more detail below, magnetic traveler mechanism 30 is configured to localize the paramagnetic particles within each of the cuvettes in a single section 14 so that multi-wash mechanism 60 can wash the cuvettes to remove excess capture reagent. Magnetic traveler mechanism 30 and multi-wash mechanism 60 work in conjunction with reaction rotor 10 to perform additional washing steps after the addition and incubation of other fluids, such as the patient sample, luminescent label and conjugate.

Figure 2:
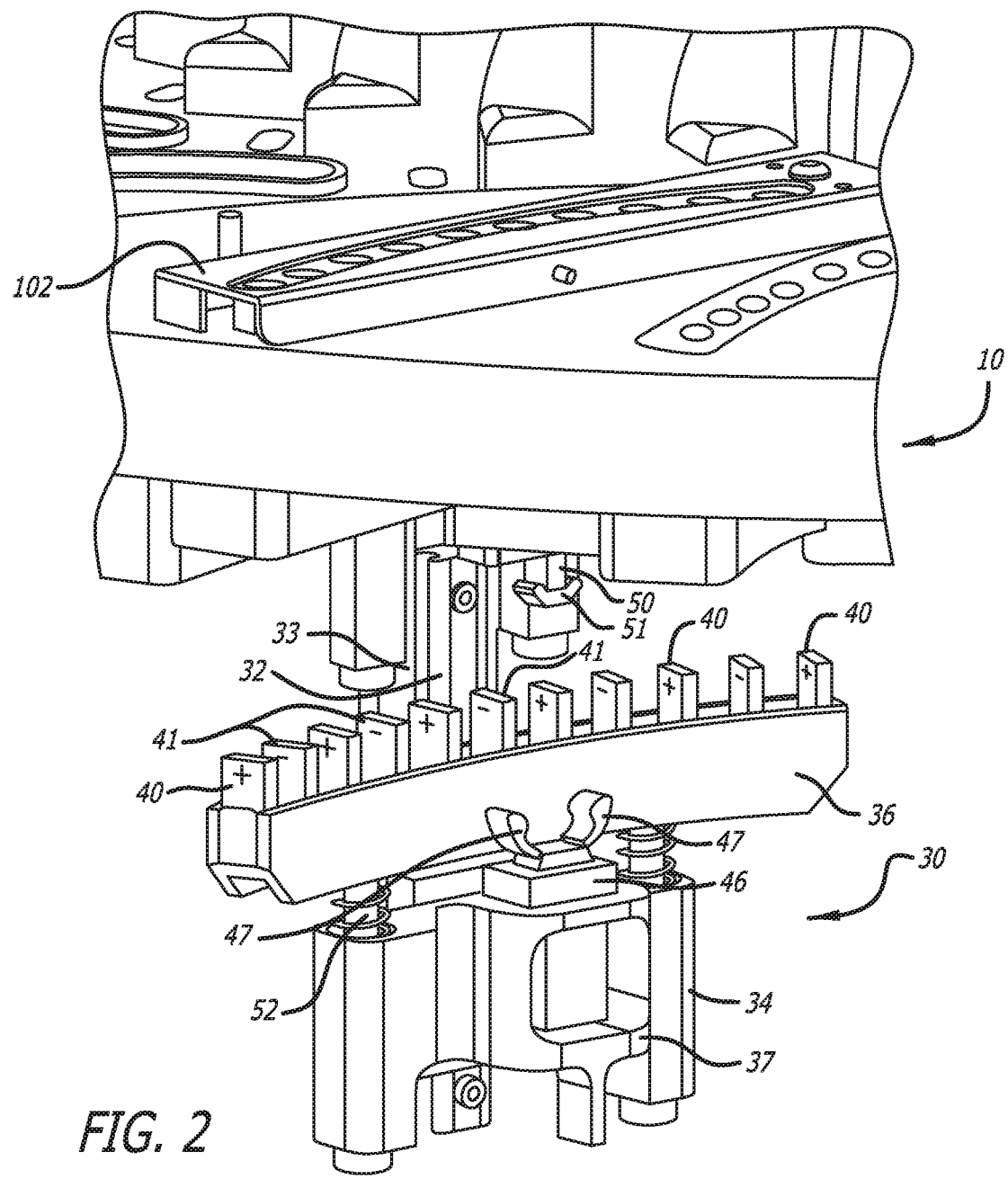
FIG. 2 is a top perspective view of an embodiment of a magnetic traveler system according to the present disclosure located underneath the reaction rotor of FIG. 1.

FIG. 2 illustrates a magnetic traveler mechanism 30 located underneath reaction rotor 10. In the illustrated embodiment, magnetic traveler mechanism 30 includes a guide rail 32 and a sliding device 34. In the illustrated embodiment, guide rail 32 is attached to a lower arm 33 that is attached to a lower surface of reaction rotor 10, and sliding device 34 is moveably attached to guide rail 32. In use, sliding device 34 slides along guide rail 32 so as to vertically translate a plurality of magnets 40, 41 both towards and away from reaction rotor 10 in an up/down direction. Sliding device 34 is further configured to lock into place underneath reaction rotor 10 so as to locate pairs of magnets 40, 41 on opposite sides of each cuvette 18 located in the reaction rotor 10 to localized the paramagnetic particles located within the cuvettes 18. Sliding device 34 can then travel back away from the cuvettes 18 when the paramagnetic particles do not need to be localized.

Figure 3:
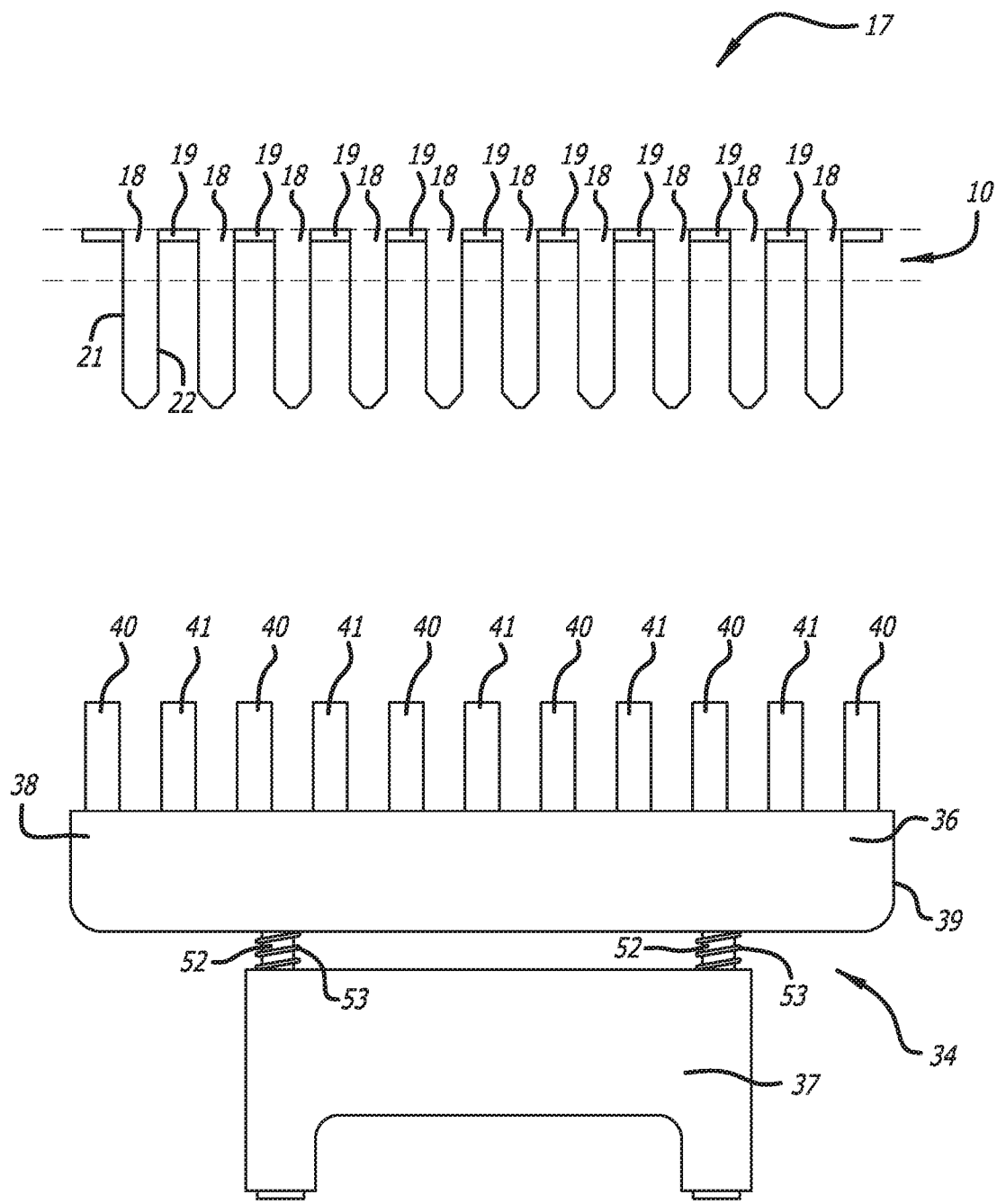
FIG. 3 is a side cross-sectional view of an embodiment of a magnetic traveler system according to the present disclosure.

FIG. 3 illustrates sliding device 34 positioned in a non-suspension state below a cuvette rack 17. The cuvette rack 17 includes a plurality of cuvettes 18 that are positioned within a plurality of adjacent apertures 18 within a single section 14 of reaction rotor 10 (shown in broken lines in FIG. 3). The cuvette rack 17 includes a plurality of connections 19 which hold the cuvettes 18 together so that the cuvettes 18 can be inserted into corresponding adjacent apertures 16 of a single section 14 in one motion. Alternatively, each cuvette 18 can be separate from one or more of the adjacent cuvettes 18 and can be separately inserted into a corresponding aperture 16 of section 14. Although not shown from this perspective, the cuvettes 18 in FIG. 3 are positioned in the arc of the apertures 16 shown in FIG. 1.

Sliding device 34 includes a magnet holder 36 with a plurality of magnets 40, 41. In the illustrated embodiment, there are ten cuvettes 18 and eleven magnets 40, 41 so that each cuvette 18 is surrounded on opposite sides by a pair of magnets. In other words, each cuvette 18 has a magnet 40, 41 on each side when the magnets 40, 41 are raised up to the cuvettes 18 by the sliding device 34. In an embodiment, the magnets 40, 41 can include a plurality of first magnets 40 and a plurality of second magnets 41, wherein the first magnets 40 each have a polarity that is opposite the polarity of the second magnets 41. The first magnets 40 and the second magnets 41 are positioned in the magnet holder 36 so that they alternate from a first side 38 of the magnet holder 36 to a second side 39 of the magnet holder 36. This alternating configuration allows each cuvette 18 to have a first magnet 40 on a first side 21 and a second magnet 41 on an opposite second side 22 when the magnets 40, 41 are raised up to the cuvettes. In alternative embodiments, adjacent magnets can have the same charge or can have opposite polarity sides so that each cuvette 18 is still surrounded by opposite polarities.

Figure 4:
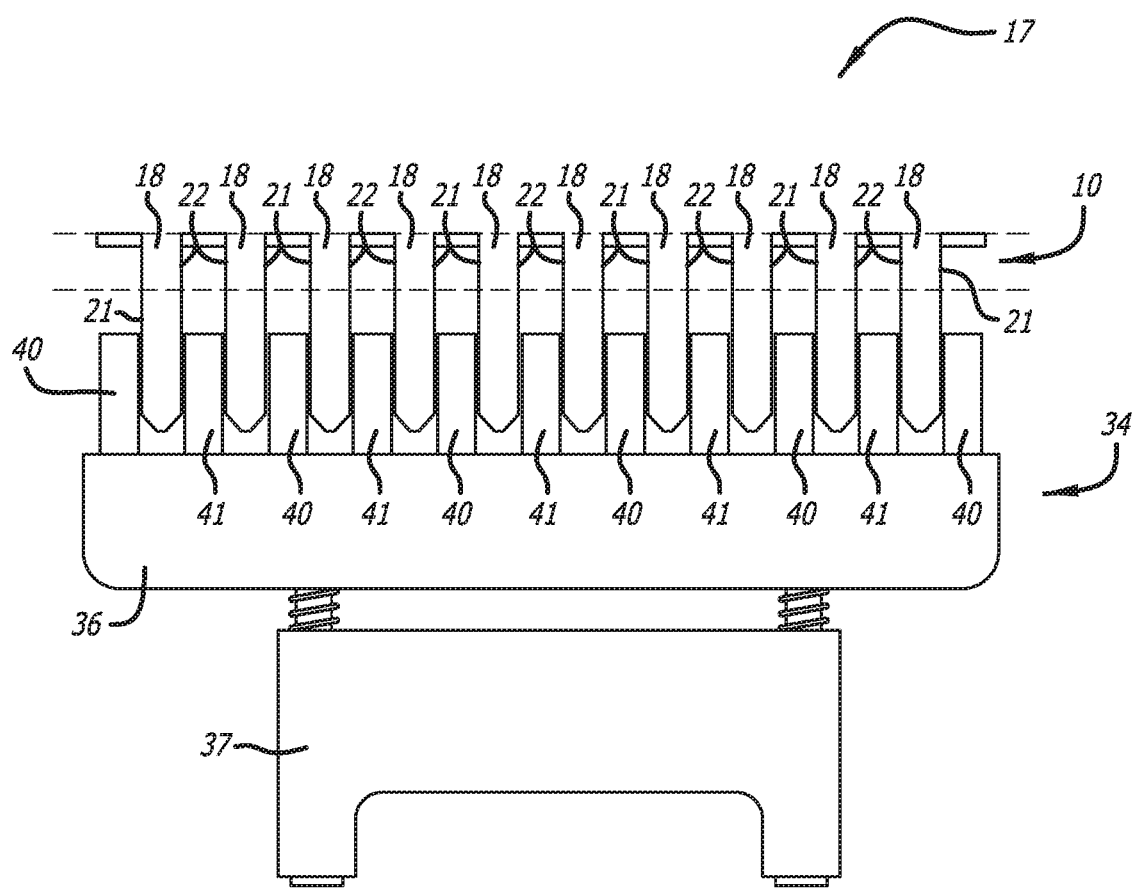
FIG. 4 is a side cross-sectional view of an embodiment of a magnetic traveler system according to the present disclosure.

FIG. 4 illustrates sliding device 34 positioned in a suspension state after sliding device 34 has been translated upwards towards the cuvettes 18 located in the apertures 16 of reaction rotor 10. As illustrated, the plurality of magnets 40, 41 have been raised to the plurality of cuvettes 18 so that each cuvette 18 has a first magnet 40 adjacent to a first side 21 and a second magnet 41 adjacent to an opposite second side 22. This alternating of first magnets 40 and second magnets 41 creates a magnetic field across each cuvette 18 which can suspend paramagnetic particles in the cuvettes 18 while the cuvettes 18 are washed by multi-wash mechanism 60.

As described above, the cuvettes 18 in FIG. 4 are each first filled with paramagnetic particles and a capture reagent while the sliding device 34 is in the nonsuspension state (FIG. 3). The capture reagent then binds to the paramagnetic particles within each cuvette during an incubation period. The capture reagent can bind to the paramagnetic particles by any chemical bond or physical attraction. Chemical bonds can include covalent or ionic bonds. Physical attraction can be through, for example, Van der Waals forces, hydrogen bonding, or the like. In one embodiment, an immunological system can be used in conjunction with the beads. For example, the paramagnetic beads can be coated with strepavadin which can bind a capture reagent that is specific for a particular human antigen. Strong forces between the solid phase immunological system and the magnetic beads can prevent wash-away when the beads are attracted to the magnetic field and washed.

After the capture reagent binds to the paramagnetic particles, it is desirable to remove excess unbound capture reagent from the cuvettes. For this purpose, the sliding device 34 is raised to the suspension state illustrated in FIG. 4. As described above, the suspension state places the magnets 40, 41 so that each cuvette 18 is surrounded on opposite sides by a first magnet 40 and a second magnet 41, which creates a magnetic field across each cuvette 18. The magnetic field localizes within each cuvette 18 the paramagnetic particles along with the capture reagent that is bound to the paramagnetic particles. Although not shown from this perspective, the magnets 40, 41 are positioned in an arc corresponding to the arc of the cuvettes 18, as can be seen in FIG. 2. The arc of the magnets 40, 41 is advantageous in this respect because the arc helps eliminate magnetic cross-talk between magnets.

The sliding device 34 includes a locking mechanism 46 (FIG. 2) that locks the sliding device 34 into the suspension state when it is desirable to localize the paramagnetic particles located in the cuvettes 18. In the illustrated embodiment, the locking mechanism 46 includes two arms 47 that surround a bulbous portion 51 of a corresponding protrusion 50 located on the underside of the reaction rotor 10. In an embodiment, the arms 47 of locking mechanism 46 can snap-fit around protrusion 50 to lock sliding device 34 into the suspension state, and sliding device 34 or reaction rotor 10 can further include a release button to release the arms 47 of locking mechanism 46 from protrusion 50 when the sliding device 34 needs to be dropped to the nonsuspension state. Those of ordinary skill in the art will also understand that the positioning of locking mechanism 46 and protrusion 50 can be reversed so that locking mechanism 46 is located on an underside of the reaction rotor and protrusion 50 is located on sliding device 34. In an embodiment, the magnetic traveler mechanism 30 can be operably connected to a computer to automate the raising, lowering and locking of the magnets 40, 41 in the suspension state.

In an embodiment, sliding device 34 further includes a base portion 37 separate from the magnet holder 36. As illustrated in FIG. 2, locking mechanism 46 is located on base portion 37, and magnet holder 36 is attached to base portion 37 by one or more rods 52. In the illustrated embodiment, the rods are fixed to magnet holder 36 and are slideably attached to base portion 37 so that magnet holder 36 can vertically translate with respect to base portion 37. This vertical translation assists in positioning the magnets 40, 41 around the cuvettes 18 when the sliding device 34 is in the suspension state. In this embodiment, the movement of base portion 37 towards magnet holder 36 compresses one or more springs 53 located between base portion 37 and magnet holder 36 once magnet holder 36 reaches its uppermost position. As the springs 53 are compressed, the springs 53 apply a force against both the base portion 37 and magnet holder 36 which pushes the magnet holder 36 to its uppermost position when the base portion 37 is locked into the reaction rotor 10 via locking mechanism 46.

Once the paramagnetic particles have been localized within each cuvette 18 by the magnets 40, 41, a washing step can be performed. In this example, the washing step is used to remove excess capture reagent, but washing steps are also used to remove other fluids from the cuvettes, such as a patient sample, conjugate sample or luminescent label. During a washing step, a rinse buffer is injected into the cuvettes and then aspirated from the cuvettes and disposed of.

Figure 5:
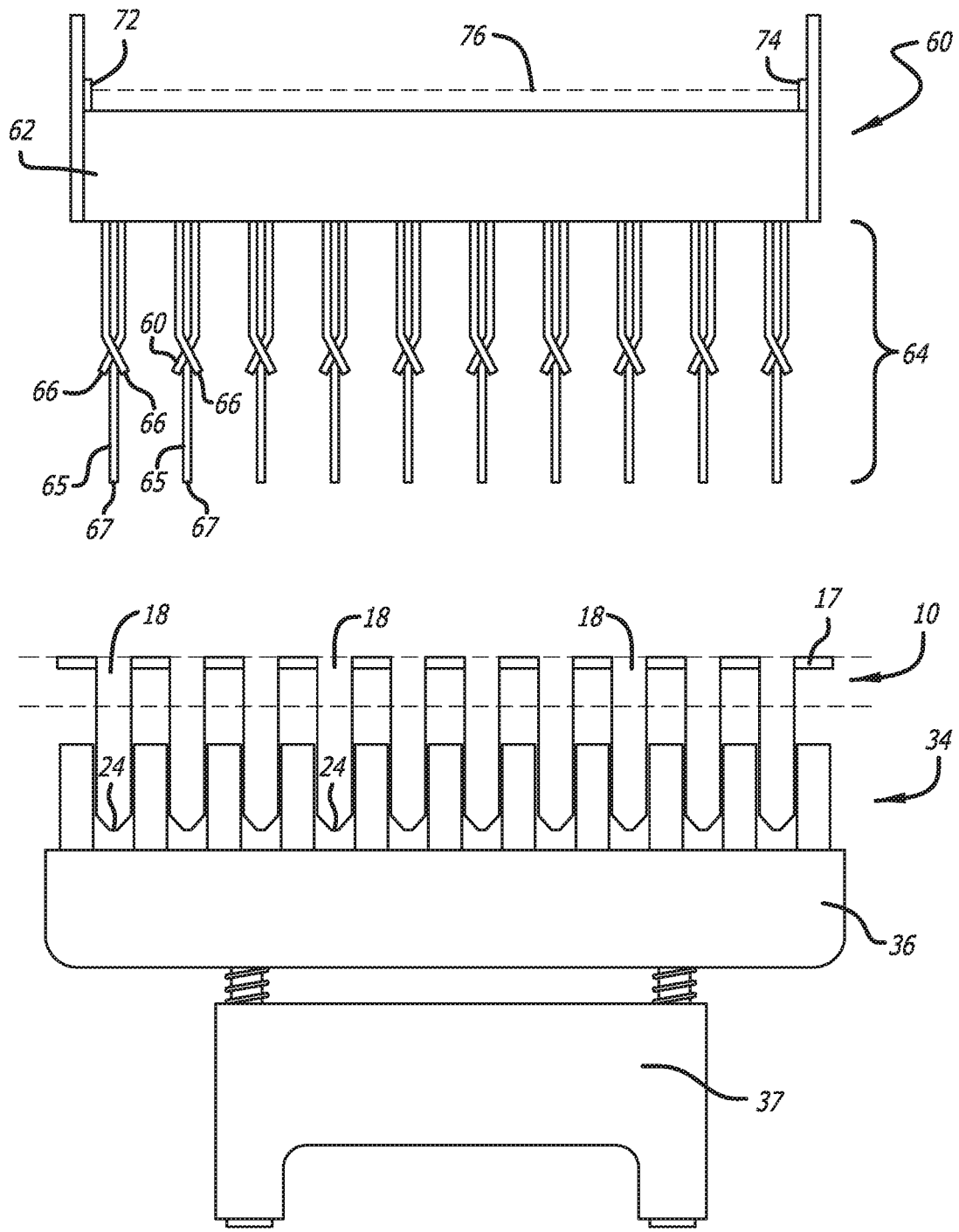
FIG. 5 is a side cross-sectional view of an embodiment of a magnetic traveler system according to the present disclosure working in conjunction with an embodiment of a multi-rinse system according to the present disclosure.

FIG. 5 illustrates a multi-wash mechanism 60 located above cuvette rack 17, which is positioned within reaction rotor 10 (shown in broken lines), as a plurality of magnets 40, 41 from magnetic traveler mechanism 30 localize the paramagnetic particles within the cuvettes 18 of cuvette rack 17. In FIG. 5, multi-wash mechanism 60 is shown in a raised state. As illustrated, multi-wash mechanism 60 includes a base 62 with a plurality of probes 64 extending therefrom. In the illustrated embodiment, multi-wash mechanism 60 includes ten probes 64 which correspond to each of the ten cuvettes 18 located on cuvette rack 17, but those of ordinary skill in the art will understand that more or less probes 64 can be used. One advantage of the present disclosure is that number of cuvettes 18, magnets 40, 41 and probes 64 correspond to one another so that the cuvettes 18 within each portion 14 of reaction rotor 10 can simultaneously have their respective paramagnetic particles localized by the magnets 40, 41 of magnetic traveler mechanism 30 while being washed by multi-wash mechanism 60. Only a single magnetic traveler mechanism 30 and a corresponding single multi-wash mechanism 60 are needed for this configuration because reaction rotor 10 can rotate each portion 14 of cuvettes 18 over the magnetic traveler mechanism 30 and beneath the multi-wash mechanism 60.

In an embodiment, multi-wash mechanism 60 includes a probe positioning sensor 70. In the illustrated embodiment, probe positioning sensor 70 includes a light emitter 72 and a light receiver 74. Light emitter 72 transmits a beam of light 76 to light receiver 74. When light receiver 74 receives the light 76 from light emitter 72, the system recognizes that the probes 64 are located in their initial position. When the light 76 is not sensed by light receiver 74, the system alerts a user that one of the probes 64 has not returned to its initial position. In FIG. 5, the system recognizes that the probes 64 are all located in their initial position and are ready to be lowered into the corresponding cuvettes 18.

Figure 6:
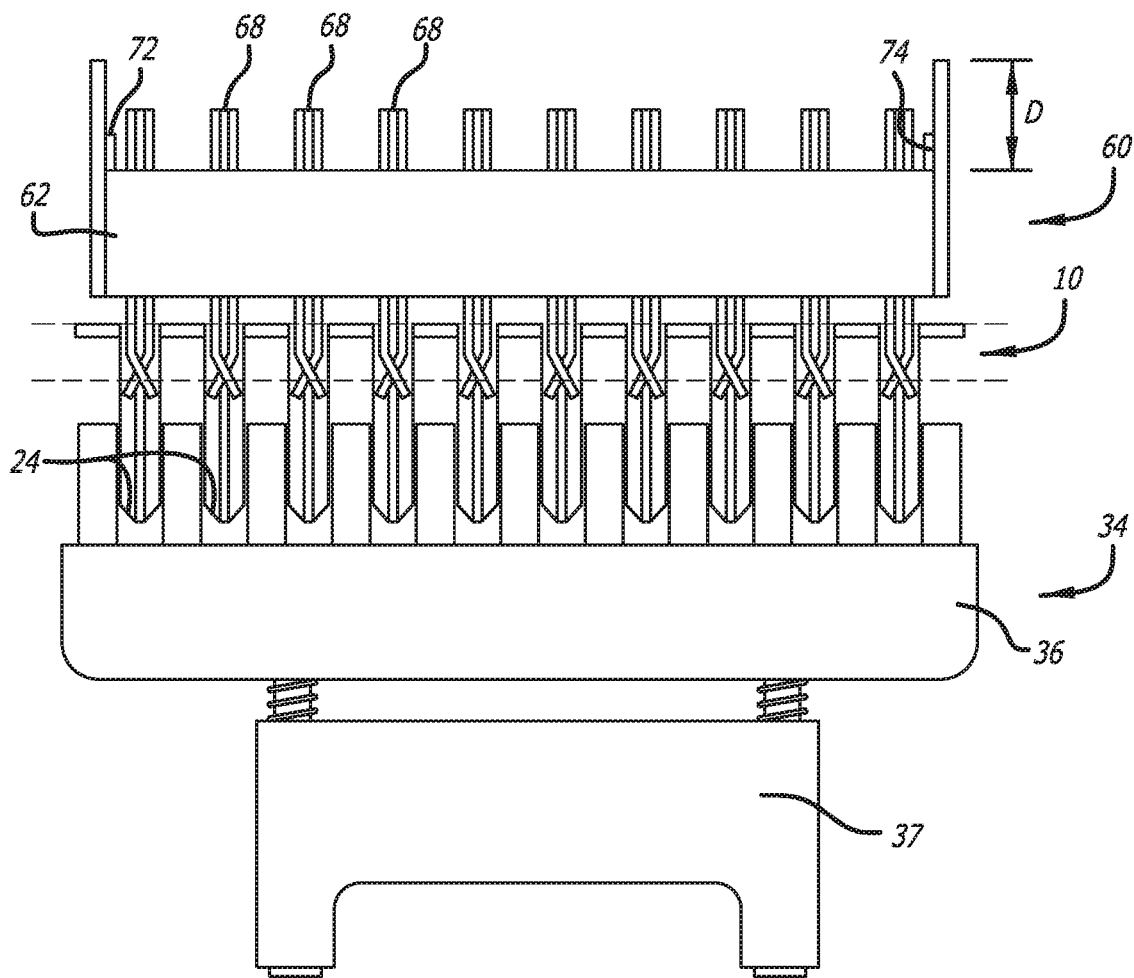
FIG. 6 is a side cross-sectional view of an embodiment of a magnetic traveler system according to the present disclosure working in conjunction with an embodiment of a multi-rinse system according to the present disclosure.

FIG. 6 shows the multi-wash mechanism 60 in a washing state after the probes 64 have been lowered into corresponding cuvettes 18. Although not shown from this perspective, the probes 64 are positioned in an arc corresponding to the arc of the cuvettes 18. In the illustrated embodiment, the probes are lowered until they contact a bottom surface 24 of each cuvette 18. The probes 64 are vertically moveable with respect to base 62, so the probes 64 each shift upwards with respect to base 62 as base 62 continues to move downward after the tip 67 of each probe comes into contact with the bottom surface 24 of each cuvette 18. This configuration ensures that the tip 67 of each probe 64 extends all the way to the bottom surface 24 of each cuvette 18. The tapered bottom surface 24 of the cuvettes 18 also ensures that the tip 67 of the probe 64 can aspirate all of the liquid in each cuvette 18. In the illustrated embodiment, the probes 64 have each shifted upwards a distance D with respect to base 64, meaning that the base 62 continued to move downwardly a distance D after the tips 67 of the cuvettes contacted the respective bottom surfaces 24 of the cuvettes 18. In the washing state shown in FIG. 6, an upper end 68 of each of the probes 64 lies in the light path between light emitter 72 and light receiver 74, so that no light is received by light receiver 74. Upper end 68 can include a portion of the probe 64 itself or any structure attached to the probe 64 that is capable of blocking light 76 that is emitted from light emitter 72. In an embodiment, light emitter 72 and light receiver 74 can be located in other positions than shown in FIG. 6, and different shaped upper ends 68 operably attached to each of the probes 64 can be used to block the different light path caused by the different positioning.

Figure 7:
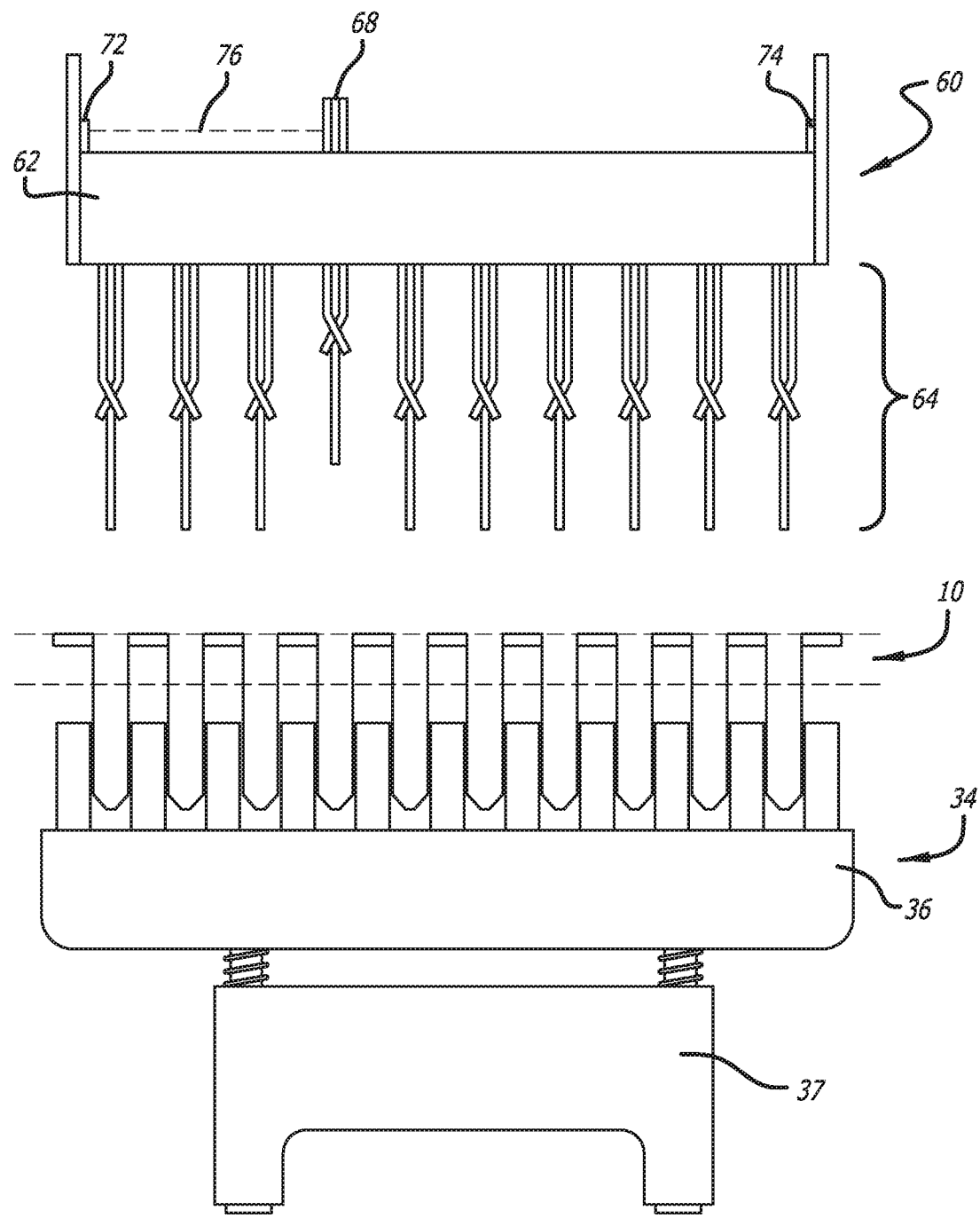
FIG. 7 is a side cross-sectional view of an embodiment of a magnetic traveler system according to the present disclosure working in conjunction with an embodiment of a multi-rinse system according to the present disclosure.

FIG. 7 shows the multi-wash mechanism 60 after it has been lifted back to its initial raised state. As illustrated, one of the probes 64 has not returned to its initial position and remains shifted with respect to base 62 so that its upper end 68 lies in the light path from light emitter 72. Since light receiver 74 is not receiving any light 76 from light receiver 72, the system can issue an alert that at least one of the probes 64 has not returned to its initial position, and the system or a user can fix the positioning of the probes 64 before another wash step occurs.

As illustrated in FIGS. 5 to 7, each probe 64 has a trident-shape that includes a first portion 65 and two second portions 66. The first portion 65 is longer than the second portions 66 and extends to the bottom surface 24 of a corresponding cuvette 18 when the multi-wash mechanism 60 is in its washing configuration. When the probe 64 is located within a cuvette 18, first portion 65 is used to aspirate the cuvette 18. The second portions 66 are shorter than the first portion 65 and serve to push out fluid while the probe 64 is located within the cuvette 18. The second portions can also advantageously be rotationally angled outwardly with respect to the radius of the cuvette to push fluid in a circular motion (e.g., clockwise or counterclockwise around the cuvette's central axis) and create a cyclone effect within the cuvette.

In an embodiment, the second portions 66 deliver washing solution to the cuvettes. The delivery of the washing solution via second portions 66 agitates the contents of the cuvette to wash away the capture reagent or other sample that is not sufficiently bound to the paramagnetic beads. After or during agitation, the washing solution can be aspirated by first portion 65. In an alternative embodiment, each probe 64 can include only one or more than two second portions 66. By using both the first portion 65 and at least one second portion 66, the multi-wash mechanism 60 can simultaneously inject fluid into and aspirate fluid from each cuvette 18 in a single wash step. In an embodiment, the probes 64 can vibrate within the cuvette 18 to mix the contents of the cuvette during injection or aspiration.

Figure 8:
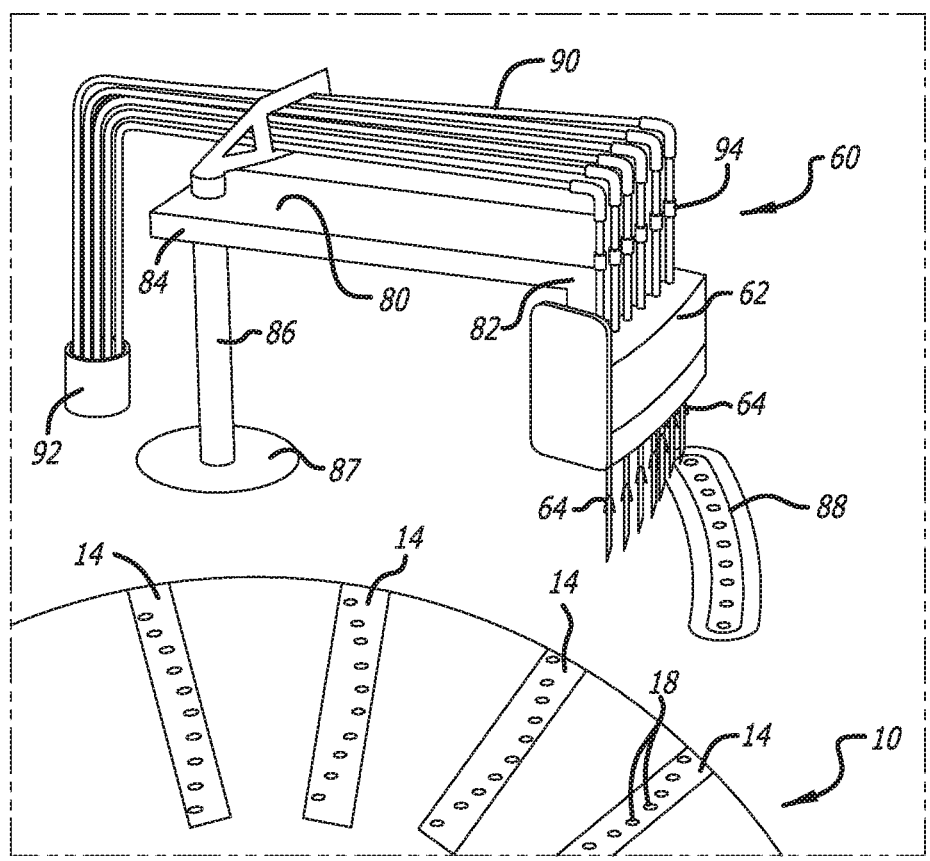
FIG. 8 is a top perspective view of an embodiment of a magnetic traveler system according to the present disclosure.

FIG. 8 illustrates a side perspective view of multi-wash mechanism 60 with elements that have been omitted from FIGS. 5 to 7 for simplicity. It should be understood that every element in FIG. 8 could also be shown in FIGS. 5 to 7 if necessary. As illustrated, base 62 is attached to a first end 82 of arm 80. A second end 84 of arm 80 is attached to a rod 86 that rotates about a vertical axis at its base 87. The rotation of rod 86 rotates arm 80 and base 62 so that the probes 64 can be moved between a rinse station 88 and each portion 14 of reaction rotor 10. Rod 86 can also be vertically raised or lowered, so as to raise and lower the probes 64 into or out of the cuvettes 18 or rinse station 88. Rinse station 88 can rinse the probes 64 of multi-wash mechanism 60 when the probes 64 are lowered into apertures in the rinse station 88.

As illustrated, a plurality of tubes 90 are connected to the probes 64. The tubes 90 run from fluid supplies (not shown, located below coupling 92) to the probes 64 at base 62. Each probe 64 can be connected to a single tube 90 or to multiple tubes 90. In an embodiment, each probe 64 is connected to at least two tubes 90 so that each probe 64 can simultaneously inject fluid through at least one second portion 66 and aspirate fluid through at least one first portion 65. In such an embodiment, each probe 64 is connected to at least one tube 90 for injection and at least one tube 90 for aspiration. Each second portion 66 can also be attached to a separate tube 90, for example, so that each probe with one first portion 65 and two second portions 66 is attached two three tubes 90 (one tube 90 for the first portion 65, and a tube 90 for each second portion 66). In another embodiment, each probe 64 is connected to one tube 90 and can alternate between injecting and aspirating fluid through the tube 90. The tubes 90 can also each include check valves 94 to prevent leakage as fluid is either injected into or aspirated from the cuvettes 18. In an embodiment, the check valves 94 are located proximal to the upper end 68 of the probes 64 to prevent the probes from dripping as fluid is dispensed. The tubes 90 can also be operatively connected to a heater to control the temperature of the fluid injected from the probes 64.

The fluid supplies connected to the plurality of tubes 90 just below coupling 92 can include, for example, a wash buffer. Distilled water can also be run through the probes to flush them out. In an embodiment, the fluid supplies are positioned on load cells so that the amount of fluid into the cuvettes can be determined based on the difference between the original weight of the fluid supply and the weight of the fluid supply after injection. Drain bags can also be positioned on load cells to keep track of the amount of fluid aspirated from the cuvettes 18 during a wash.

The method according to the present disclosure accordingly begins, as described above, by adding paramagnetic particles and a capture reagent to each of the cuvettes 18 in a section 14 of reaction rotor 10. After the capture reagent binds to the paramagnetic particles within each cuvette 18, magnetic traveler mechanism 30 can be used to localize the paramagnetic particles while multi-wash mechanism 60 washes excess unbound capture reagent from the cuvettes 18. This step constitutes the first wash step in a multi-wash method.

Once excess capture reagent has been removed from the cuvettes 18, reaction rotor 10 can rotate the cuvettes 18 so that a patient sample can be injected into the cuvettes 18 to bind with the paramagnetic particles during another incubation period due to the presence of the capture reagent already bound to the paramagnetic particles. Excess patient sample must then be washed from the cuvettes 18 by rotating the cuvettes 18 over the magnetic traveler mechanism 30 and localizing the paramagnetic particles while multi-wash mechanism 60 washes excess unbound patient sample from the cuvettes. To localize and wash the patient sample, magnetic traveler mechanism 30 and multi-wash mechanism 60 operate as described above with respect to the capture reagent. In an embodiment, three separate washes are performed on each cuvette 18 after the patient incubation period in which the patient sample binds to the paramagnetic particles.

After the patient sample washes, reaction rotor 10 can rotate the cuvettes 18 so that a conjugate sample can be injected into the cuvettes to bind with the paramagnetic particles during another incubation period. Excess conjugate sample must then be washed from the cuvettes 18 by rotating the cuvettes 18 over the magnetic traveler mechanism 30 and localizing the paramagnetic particles while multi-wash mechanism 60 washes excess unbound conjugate from the cuvettes. To localize and wash the conjugate, magnetic traveler mechanism 30 and multi-wash mechanism 60 operate as described above with respect to the capture reagent. In an embodiment, four separate washes are performed on each cuvette 18 after the incubation period in which the conjugate binds to the paramagnetic particles. One or more washes can also be performed after the addition and incubation of the luminescent label.

Reaction rotor 10, magnetic traveler mechanism 30 and multi-wash mechanism 60 can therefore operate together to perform a number of washing steps for a number of different samples that bind to the paramagnetic particles. Reaction rotor 10 is positioned with respect to magnetic traveler mechanism 30 and multi-wash mechanism 60 so that a washing step can be performed on one section 14 of reaction rotor 10 while a sample is added to the cuvettes 18 in another section 14. Reaction rotor 10 can then continue to rotate so that the cuvettes 18 in the other section 14 can be washed. By operating in this manner, reaction rotor 10, magnetic traveler mechanism 30 and multi-wash mechanism 60 provide an efficient system for washing the cuvettes 18.

FIGS. 9 to 12 illustrate a lid mechanism 100 according to the present disclosure. Lid mechanism 100 can operate in conjunction with reaction rotor 10, magnetic traveler mechanism 30 and multi-wash mechanism 60 so that the cuvettes 18 placed on reaction rotor 10 are held stationary in the correct position while reaction rotor 10 rotates the cuvettes 18, while magnetic traveler system 30 raises the magnets 40, 41 to the cuvettes, and while multi-wash mechanism 60 performs one or more washing steps.

Figure 9:
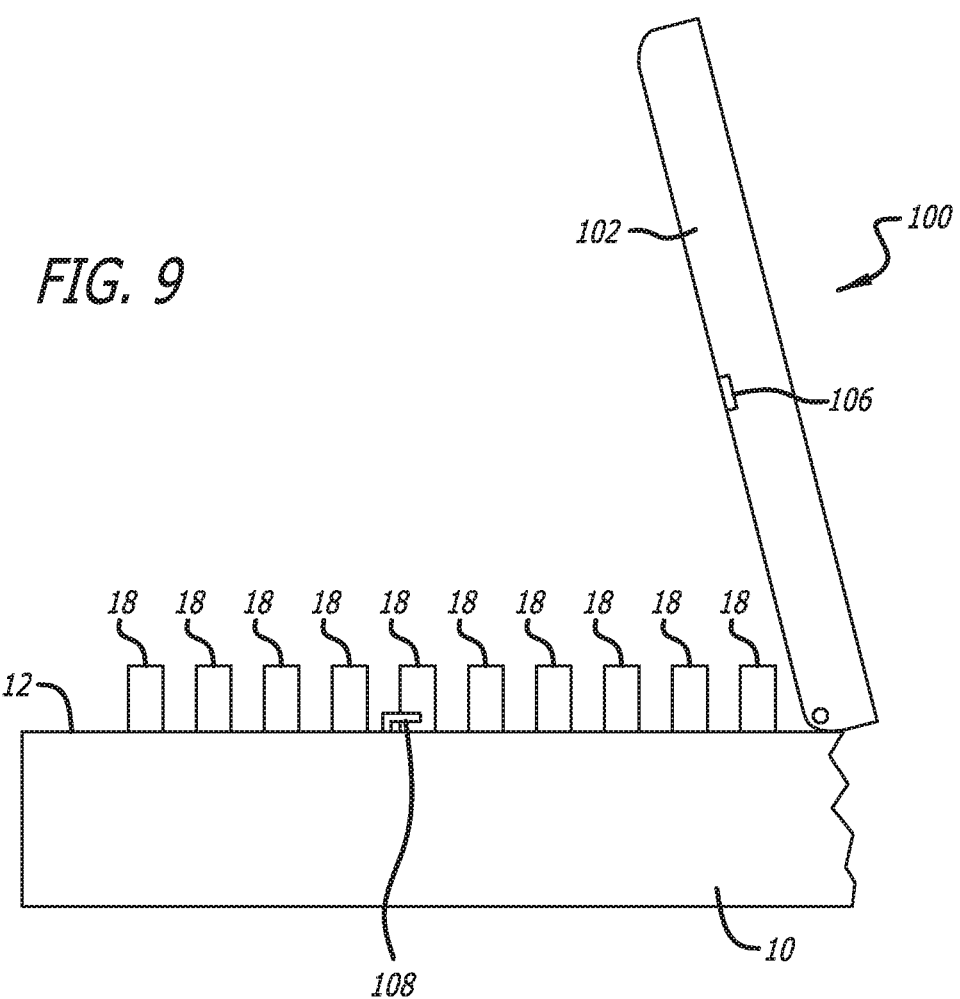
FIG. 9 is a side elevational view of an embodiment of a lid mechanism according to the present disclosure.
Figure 10:
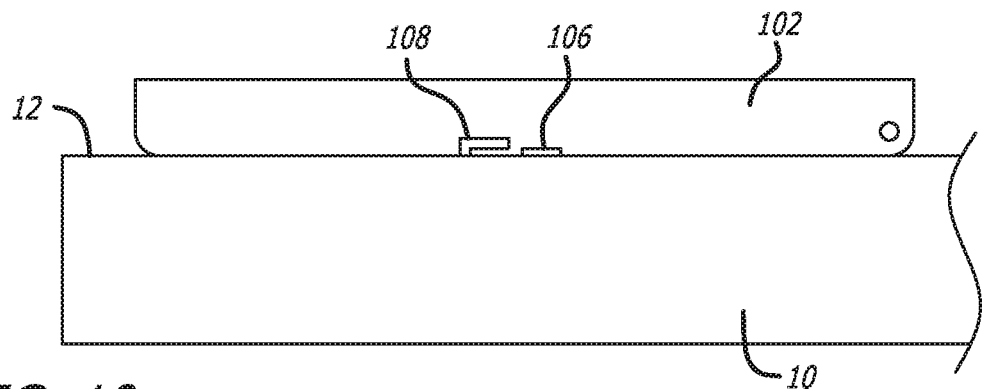
FIG. 10 is a side elevational view of an embodiment of a lid mechanism according to the present disclosure.
Figure 11:
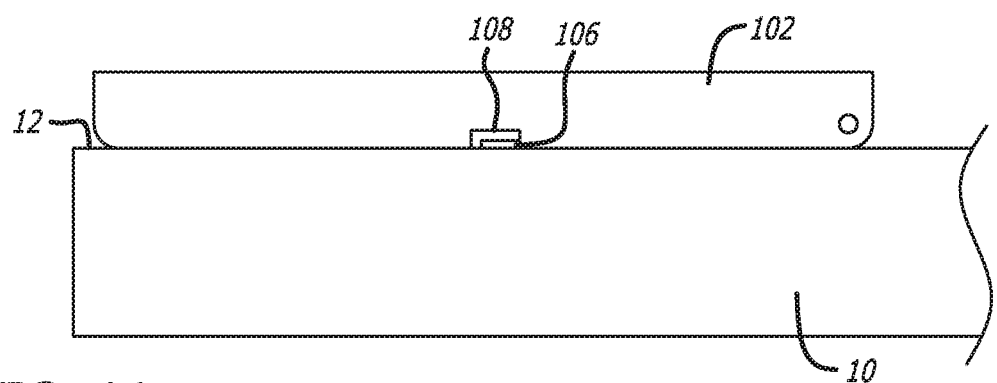
FIG. 11 is a side elevational view of an embodiment of a lid mechanism according to the present disclosure.

FIG. 9 shows lid mechanism 100 with a lid 102 that is hinged to reaction rotor 10 in a raised configuration. In the raised configuration, one or more cuvettes 18 can be loaded into reaction rotor 10. Once loaded, lid 102 is lowered as illustrated in FIG. 10. As lid 102 is lowered, lid 102 can slightly compress the cuvettes 18 against reaction rotor 10 so that the cuvettes 18 remain in the correct position even if nudged by magnetic traveler mechanism 30 or multi-wash mechanism 60 as they are raised and lowered towards and away from the cuvettes 18. As understood from the discussion above, an advantage of the present disclosure is that the reaction rotor 10, magnetic traveler mechanism 30 and multi-wash mechanism 60 are all positioned to work together so that the cuvettes 18 are rotated into a position where multiple cuvettes 18 can have their paramagnetic particles localized during one or more washing steps. Ensuring that the cuvettes 18 do not shift during the process is important to the overall functionality of the system.

Figure 12:
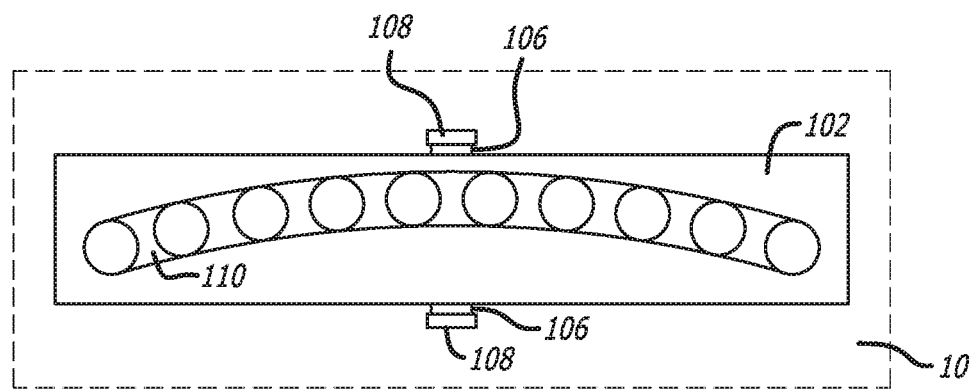
FIG. 12 is a top plan view of an embodiment of a lid mechanism according to the present disclosure.

As illustrated in FIGS. 9 to 12, lid 102 has an attachment mechanism 104 that holds lid 102 against the cuvettes 18 and reaction rotor 10 and prevents lid 102 from being raised during use of reaction rotor 10. In the illustrated embodiment, attachment mechanism 104 includes a tab 106 that projects outwardly from lid 102. As illustrated in FIG. 10, tab 106 is positioned adjacent to a corresponding arm 108 on reaction rotor 10 when lid 102 is lowered onto the cuvettes 18. Lid 102 can then be translated to the side (to the left in FIG. 11) so that arm 108 receives tab 106 and holds lid 102 against reaction rotor 10 until lid 102 is then translated back in the other direction. As illustrated in FIG. 12, lid 102 includes an opening on its upper surface that allows the probes 64 of multi-wash mechanism 60 to access each cuvette 18. The top surface 12 of reaction rotor 10 can also be raised or lowered to ensure that tab 106 and arm 108 fit together.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements.

The terms "a" and "an" and "the" and similar referents used in the context of the disclosure (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided herein is intended merely to better illuminate the disclosure and does not pose a limitation on the scope of the disclosure otherwise claimed. No language in the specification should be construed as indicating any non-claimed element essential to the practice of the disclosure.

The use of the term "or" in the claims is used to mean "and/or" unless explicitly indicated to refer to alternatives only or the alternatives are mutually exclusive, although the disclosure supports a definition that refers to only alternatives and "and/or."

Groupings of alternative elements or embodiments of the disclosure disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is herein deemed to contain the group as modified thus fulfilling the written description of all Markush groups used in the appended claims.

Preferred embodiments of the disclosure are described herein, including the best mode known to the inventors for carrying out the disclosure. Of course, variations on those preferred embodiments will become apparent to those of ordinary skill in the art upon reading the foregoing description. The inventor expects those of ordinary skill in the art to employ such variations as appropriate, and the inventors intend for the disclosure to be practiced otherwise than specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

Specific embodiments disclosed herein may be further limited in the claims using consisting of or consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments of the disclosure so claimed are inherently or expressly described and enabled herein.

Further, it is to be understood that the embodiments of the disclosure disclosed herein are illustrative of the principles of the present disclosure. Other modifications that may be employed are within the scope of the disclosure. Thus, by way of example, but not of limitation, alternative configurations of the present disclosure may be utilized in accordance with the teachings herein. Accordingly, the present disclosure is not limited to that precisely as shown and described.

ADDITIONAL ASPECTS OF THE PRESENT DISCLOSURE

Aspects of the subject matter described herein may be useful alone or in combination with any one or more of the other aspect described herein. Without limiting the foregoing description, in a first aspect of the present disclosure, a system for washing a plurality of fluid samples respectively located within a plurality of cuvettes includes a rotor configured to rotate the plurality of cuvettes about an axis, a traveler mechanism located beneath the rotor, the traveler mechanism configured to move a plurality of magnets parallel to the axis of rotation of the rotor to position the plurality of magnets so that each cuvette of the plurality of cuvettes is located adjacent to at least one magnet of the plurality of magnets, and a wash system located above the rotor, the wash system configured to at least one of inject fluid into or aspirate fluid from the plurality of the cuvettes, while the plurality of magnets suspend magnetic particles located within each of the plurality of cuvettes.

In accordance with a second aspect of the present disclosure, which may be used in combination with any other aspect or combination of aspects listed herein, the axis of rotation of the rotor is a vertical axis.

In accordance with a third aspect of the present disclosure, which may be used in combination with any other aspect or combination of aspects listed herein, the wash system is configured to inject fluid into and aspirate fluid from the plurality of the cuvettes.

In accordance with a fourth aspect of the present disclosure, which may be used in combination with any other aspect or combination of aspects listed herein, the plurality of magnets includes a plurality of first magnets with a first polarity and a plurality of second magnets with an opposite second polarity.

In accordance with a fifth aspect of the present disclosure, which may be used in combination with any other aspect or combination of aspects listed herein, the traveler system is configured to position the plurality of magnets so that each of the plurality of cuvettes has a first magnet on a first side and a second magnet on an opposite second side.

In accordance with a sixth aspect of the present disclosure, which may be used in combination with any other aspect or combination of aspects listed herein, the wash system includes a plurality of probes configured to at least one of inject fluid into or aspirate fluid from the plurality of the cuvettes.

In accordance with a seventh aspect of the present disclosure, which may be used in combination with any other aspect or combination of aspects listed herein, the probes each include a first portion to aspirate fluid from a respective cuvette and a second portion to inject fluid into the respective cuvette.

In accordance with an eighth aspect of the present disclosure, which may be used in combination with any other aspect or combination of aspects listed herein, the wash system includes a probe positioning sensor configured to determine if at least one of the probes is misaligned.

In accordance with a ninth aspect of the present disclosure, which may be used in combination with any other aspect or combination of aspects listed herein, the traveler mechanism includes a guide rail and a sliding device, and the sliding device translates along the guide rail to position the plurality of magnets so that each cuvette of the plurality of cuvettes is located adjacent to at least one magnet of the plurality of magnets.

In accordance with a tenth aspect of the present disclosure, which may be used in combination with any other aspect or combination of aspects listed herein, the sliding device includes a base portion and a magnet holder, wherein the base portion is moveable along the guide rail, and the magnet holder is separately moveable with respect to the base portion.

In accordance with an eleventh aspect of the present disclosure, which may be used in combination with any other aspect or combination of aspects listed herein, the plurality of magnets is positioned in an arc that corresponds to an arc of the plurality of cuvettes located on the rotor.

In accordance with a twelfth aspect of the present disclosure, which may be used in combination with any other aspect or combination of aspects listed herein, a system for washing a plurality of fluid samples respectively located within a plurality of cuvettes includes a holder to hold the plurality of cuvettes, a traveler mechanism configured to translate upwardly towards the plurality of cuvettes held by the holder and position a plurality of magnets adjacent to the plurality of cuvettes so that each cuvette of the plurality of cuvettes has a first magnet of the plurality of magnets adjacent to a first side and a second magnet of the plurality of magnets adjacent to an opposite second side, thereby suspending magnetic particles located within each of the plurality of cuvettes, and a wash system configured to translate downwardly towards the plurality of cuvettes held by the holder so as to position a probe within each of the plurality of cuvettes while the plurality of magnets suspend the magnetic particles located within each of the plurality of cuvettes.

In accordance with a thirteenth aspect of the present disclosure, which may be used in combination with any other aspect or combination of aspects listed herein, the system includes a rotor, the rotor including the holder, and the rotor is configured to rotate the plurality of cuvettes about an axis to position the cuvettes over the traveler system.

In accordance with a fourteenth aspect of the present disclosure, which may be used in combination with any other aspect or combination of aspects listed herein, the axis of rotation of the rotor is a vertical axis, and wherein the traveler mechanism is configured to translate upwardly parallel to the vertical axis.

In accordance with a fifteenth aspect of the present disclosure, which may be used in combination with any other aspect or combination of aspects listed herein, the traveler mechanism includes a guide rail and a sliding device, and wherein the sliding device translates along the guide rail to position the plurality of magnets adjacent to the plurality of cuvettes.

In accordance with a sixteenth aspect of the present disclosure, which may be used in combination with any other aspect or combination of aspects listed herein, a method of washing a plurality of fluid samples respectively located within a plurality of cuvettes includes adding magnetic particles to the plurality of cuvettes, rotating the plurality of cuvettes over a plurality of magnets, raising the plurality of magnets so that each cuvette of the plurality of cuvettes has a first magnet of the plurality of magnets adjacent to a first side and a second magnet of the plurality of magnets adjacent to an opposite second side, suspending the magnetic particles in the plurality of cuvettes with the plurality of magnets, lowering a plurality of probes so that each cuvette of the plurality of cuvettes has a probe of the plurality of probes located therein, and aspirating fluid from each cuvette of the plurality of cuvettes with a respective probe.

In accordance with a seventeenth aspect of the present disclosure, which may be used in combination with any other aspect or combination of aspects listed herein, raising the magnets includes positioning a magnet having a first polarity adjacent to the first side and a magnet having an opposite second polarity adjacent to the second side.

In accordance with a eighteenth aspect of the present disclosure, which may be used in combination with any other aspect or combination of aspects listed herein, the method includes raising the plurality of probes away from the cuvettes and detecting if one or more of the probes becomes misaligned.

In accordance with a nineteenth aspect of the present disclosure, which may be used in combination with any other aspect or combination of aspects listed herein, the method includes locking the cuvettes into a rotor with a removeable lid.

In accordance with a twentieth aspect of the present disclosure, which may be used in combination with any other aspect or combination of aspects listed herein, the method includes raising the plurality of magnets and lowering the plurality of probes in directions parallel to a rotational axis of the cuvettes.

Unless otherwise indicated, all numbers expressing quantities of ingredients, properties such as molecular weight, reaction conditions, and so forth used in the specification and claims are to be understood as being modified in all instances by the term "about." As used herein the terms "about" and "approximately" means within 10 to 15%, preferably within 5 to 10%. Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The terms "a," "an," "the" and similar referents used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments of this invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Specific embodiments disclosed herein may be further limited in the claims using consisting of or consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments of the invention so claimed are inherently or expressly described and enabled herein.

Furthermore, numerous references have been made to patents and printed publications throughout this specification. Each of the above-cited references and printed publications are individually incorporated herein by reference in their entirety.

In closing, it is to be understood that the embodiments of the invention disclosed herein are illustrative of the principles of the present invention. Other modifications that may be employed are within the scope of the invention. Thus, by way of example, but not of limitation, alternative configurations of the present invention may be utilized in accordance with the teachings herein. Accordingly, the present invention is not limited to that precisely as shown and described.

The invention is claimed as follows:

1. A system for washing a plurality of cuvettes each containing a fluid sample and magnetic particles, comprising:
a rotor configured to rotate the plurality of cuvettes about a vertical axis;
a traveler mechanism located beneath the rotor, the traveler mechanism including:
a guide rail provided in a vertical orientation with respect to the rotor,
a sliding device configured to vertically translate along the guide rail, and
a magnet holder connected to the sliding device, the magnet holder configured to retain a plurality of magnets that are spaced apart at a distance to enable a respective cuvette to pass between adjacent magnets,
wherein the sliding device is configured to translate vertically toward the rotor to position the plurality of magnets so that each cuvette of the plurality of cuvettes is located adjacent to at least one magnet of the plurality of magnets; and
a wash mechanism located above the rotor, the wash mechanism including:
an arm configured to be movable vertically and horizontally with respect to the rotor,
a plurality of tubes supported by the arm and connected to at least one fluid supply, and
a base connected to an end of the arm, the base configured to retain a plurality of probes that are each fluidly connected to one of the plurality of tubes,
wherein the wash mechanism is configured to use the plurality of tubes and the plurality of probes to wash the fluid sample within each of the plurality of cuvettes by at least one of injecting fluid into or aspirating fluid from the plurality of the cuvettes when the arm is horizontally aligned with the plurality of cuvettes and translated vertically to place at least a portion of the plurality of probes respectively into the plurality of cuvettes, while the plurality of magnets suspend the magnetic particles and the bound fluid sample located within each of the plurality of cuvettes.

2. The system of claim 1, wherein the sliding device is configured to translate vertically away from the rotor after the suspension of the magnetic particles is no longer needed.

3. The system of claim 1, wherein the wash mechanism is configured to inject the fluid into and aspirate the fluid from the plurality of the cuvettes.

4. The system of claim 1, wherein the plurality of magnets includes a plurality of first magnets with a first polarity and a plurality of second magnets with an opposite second polarity.

5. The system of claim 4, wherein the plurality of magnets is positioned in the magnet holder of the traveler mechanism so that each of the plurality of cuvettes has one of the first magnets on a first side and one of the second magnets on an opposite second side.

6. The system of claim 1, wherein the plurality of tubes are connected to a heater configured to heat at least one of the injected fluid or the aspirated fluid.

7. The system of claim 1, wherein the probes each include a first section to aspirate the fluid from a respective cuvette and a second section to inject the fluid into the respective cuvette.

8. The system of claim 1, wherein the wash mechanism includes a probe positioning sensor configured to determine if at least one of the probes is misaligned with respect to an initial position.

9. The system of claim 1, wherein the sliding device includes a base portion, wherein the base portion is moveable along the guide rail, and wherein the magnet holder is separately moveable with respect to the base portion.

10. The system of claim 1, wherein the plurality of magnets is positioned in an arc that corresponds to an arc of the plurality of cuvettes located on the rotor.

11. The system of claim 7, wherein the first section of each of the probes is longer in length compared to the second section.

12. The system of claim 1, wherein the rotor includes a holder to retain the plurality of cuvettes, the rotor being configured to align the plurality of cuvettes with the magnet holder of the traveler mechanism.

13. The system of claim 1, wherein the traveler mechanism further includes a locking mechanism configured to engage a protrusion located on an underside of the rotor to hold the traveler mechanism in place when the plurality of cuvettes is located adjacent to the plurality of magnets.

14. The system of claim 1, wherein the traveler mechanism further includes at least one rod configured to connect the sliding device to the magnet holder.

15. The system of claim 1, wherein the fluid includes a wash buffer and the fluid sample includes at least one of a reagent, a conjugate sample, or luminescent label.

16. The system of claim 1, further comprising a rod having a first end connected to an opposite end of the arm and a second end connected to a base, the rod configured to rotate about a vertical axis to provide arm horizontal rotation.

17. A system for washing a plurality of cuvettes each containing a fluid sample and magnetic particles, comprising:
   a rotor configured to rotate the plurality of cuvettes about vertical axis;
   a traveler mechanism located beneath the rotor, the traveler mechanism including:
      a guide rail provided in a vertical orientation with respect to the rotor,
      a sliding device configured to vertically translate along the guide rail, and
      a magnet holder connected to the sliding device, the magnet holder configured to retain a plurality of magnets,
   wherein the sliding device is configured to translate vertically toward the rotor to position the plurality of magnets so that each cuvette of the plurality of cuvettes is located adjacent to at least one magnet of the plurality of magnets; and
   a wash mechanism located above the rotor, the wash mechanism including:
      a plurality of tubes connected to at least one fluid supply, and
      a plurality of probes that are each fluidly connected to one of the plurality of tubes,
      wherein the wash mechanism is configured to use the plurality of tubes and the plurality of probes to wash the fluid sample within each of the plurality of cuvettes by at least one of injecting fluid into or aspirating fluid from the plurality of cuvettes when at least a portion of each of the plurality of probes is placed into a respective one of the plurality of cuvettes, while the plurality of magnets cause the magnetic particles and the bound fluid sample to be suspended within each of the plurality of cuvettes.

18. The system of claim 17, wherein the rotor includes a holder to retain the plurality of cuvettes, the rotor being configured to align the plurality of cuvettes with the magnet holder of the traveler mechanism.

19. The system of claim 17, wherein the plurality of magnets includes a plurality of first magnets with a first polarity and a plurality of second magnets with an opposite second polarity, and
   wherein the traveler mechanism is configured to position the plurality of magnets so that each of the plurality of cuvettes has one of the first magnets on a first side and one of the second magnets on an opposite second side.

20. The system of claim 17, wherein the fluid includes a wash buffer and the fluid sample includes at least one of a reagent, a conjugate sample, or luminescent label.

* * * * *